Sept. 9, 1930.   A. V. ROWE   1,775,500
LAWN MOWER
Filed Nov. 26, 1928   3 Sheets-Sheet 1
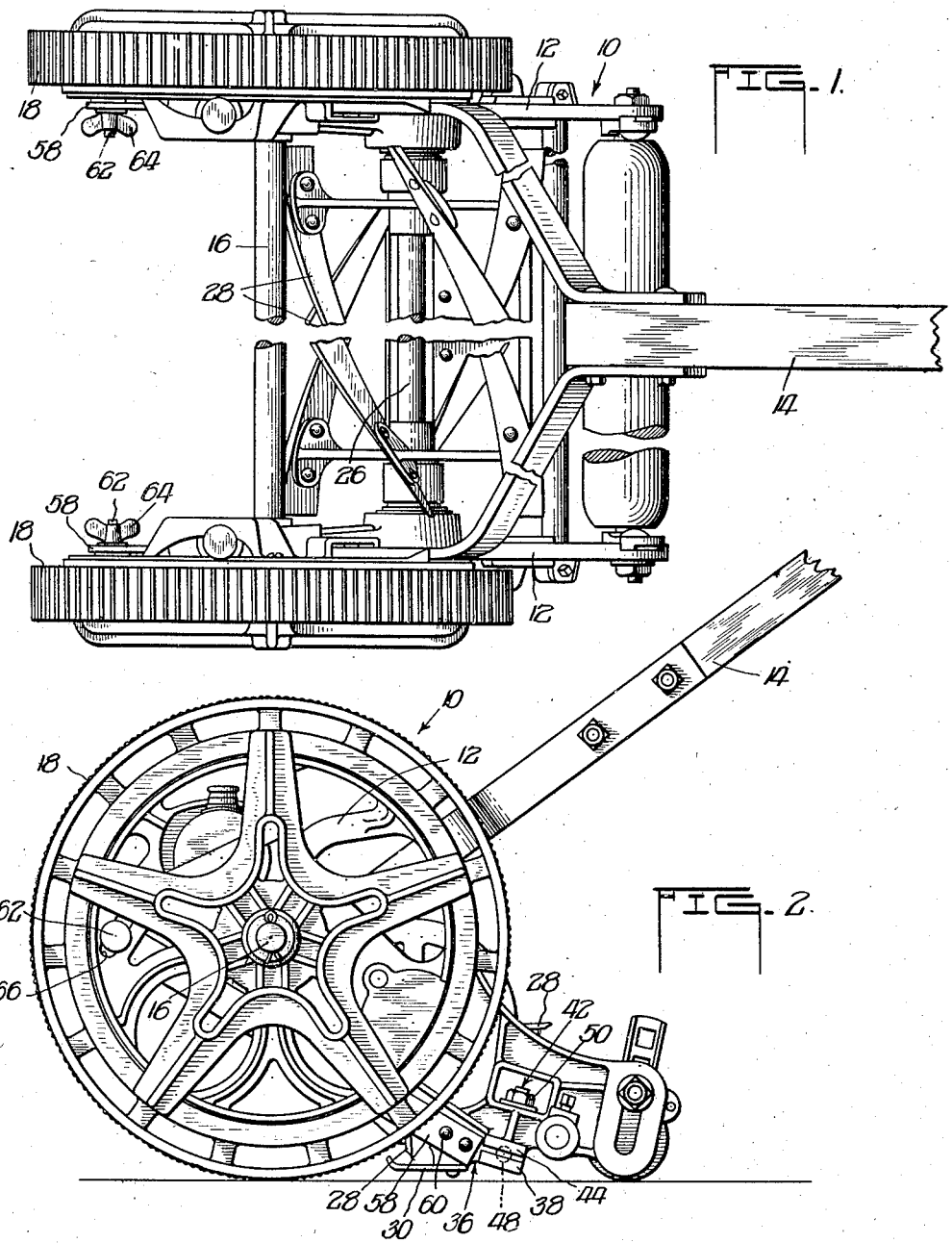
INVENTOR.
ALVIN V. ROWE,
BY Cheever & Cox
ATTYS.

Sept. 9, 1930.  A. V. ROWE  1,775,500
LAWN MOWER
Filed Nov. 26, 1928  3 Sheets-Sheet 2
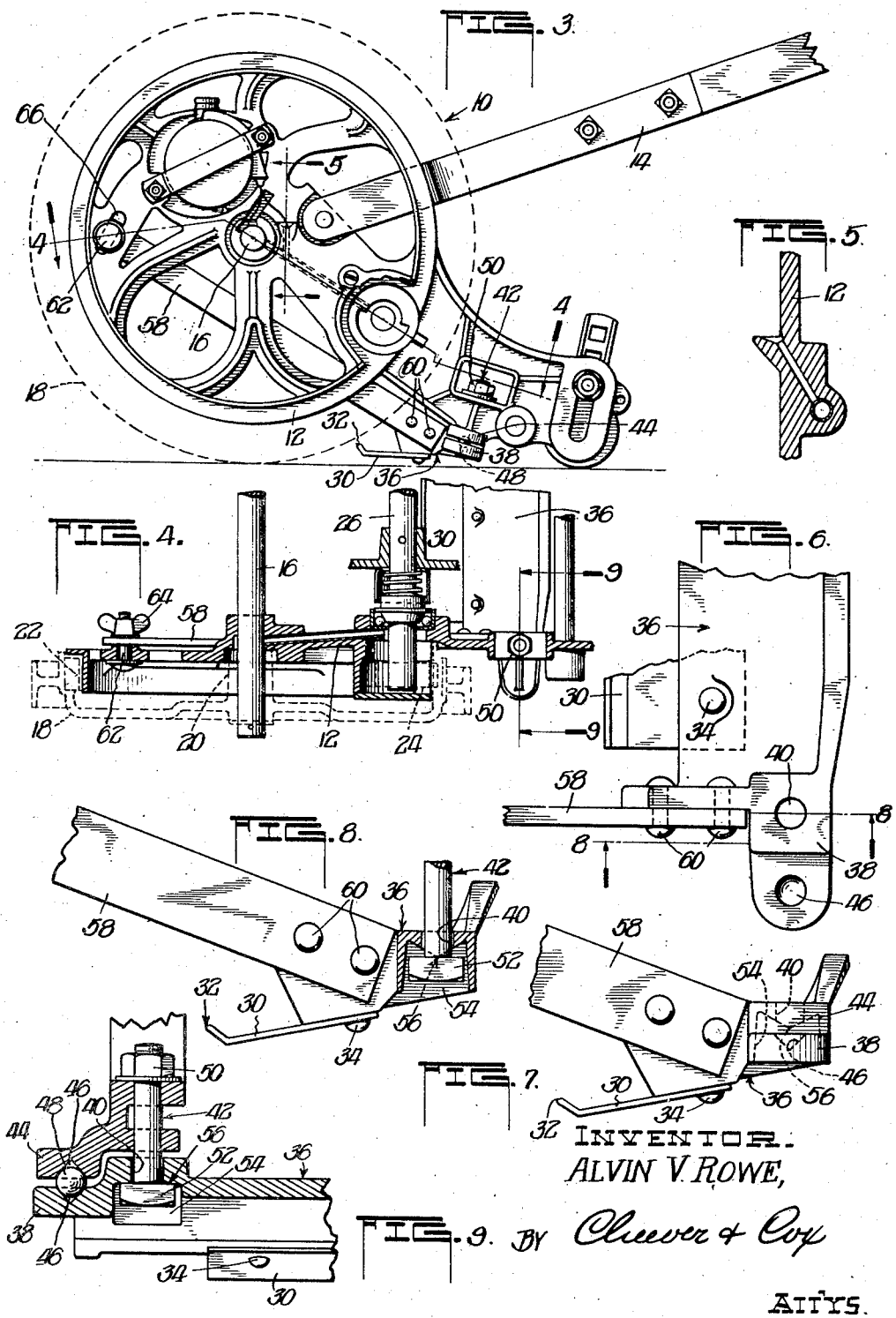

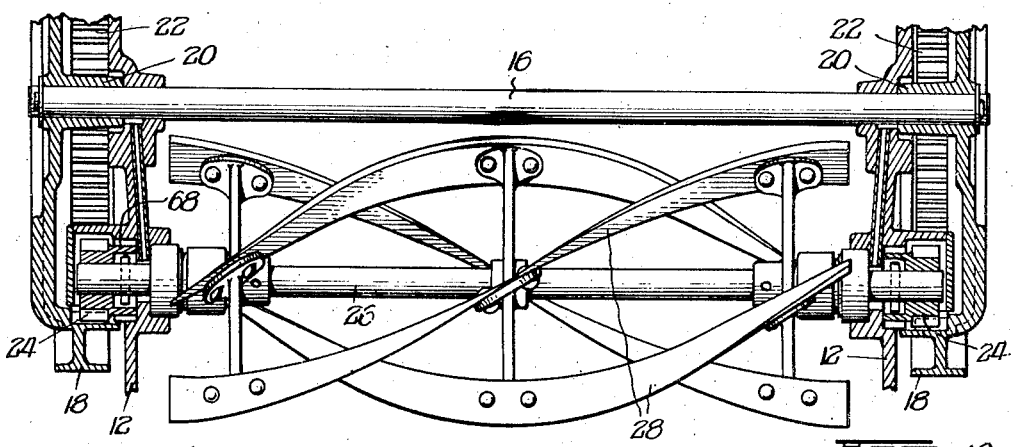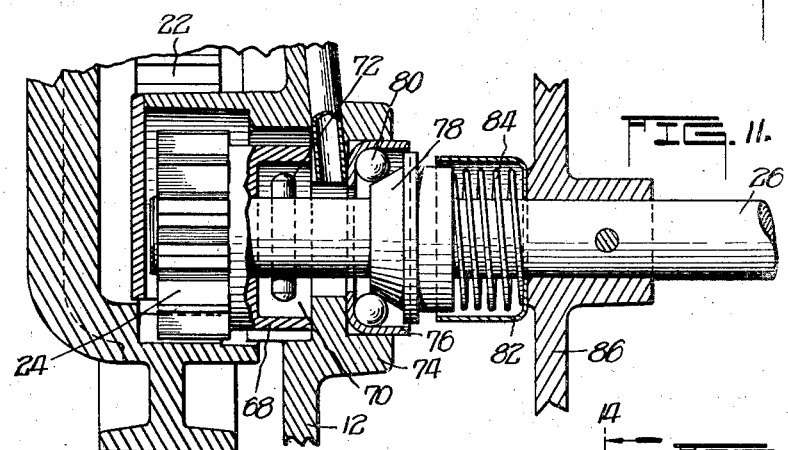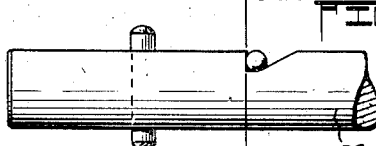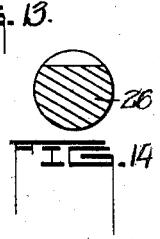

Patented Sept. 9, 1930

1,775,500

UNITED STATES PATENT OFFICE

ALVIN V. ROWE, OF GALESBURG, ILLINOIS, ASSIGNOR TO ROWE MANUFACTURING COMPANY, OF GALESBURG, ILLINOIS, A CORPORATION OF ILLINOIS

LAWN MOWER

Application filed November 26, 1928. Serial No. 321,803.

My invention relates generally to lawn mowers and particularly to improvements in lawn mower cutter bar and bearing constructions.

One of the important objects of my present invention is to provide a lawn mower with an improved cutter bar mounting and means for adjusting said cutter bar with respect to the reel blades.

It has heretofore been the common practice in some instances to pivotally mount each extremity of the lawn mower cutter bar within sockets formed in the fixed side frames, and in such constructions difficulty in properly adjusting the position of the cutter bar with respect to the reel blades has been experienced. Some of these difficulties have resulted from the fact that when the lawn mower is permitted to remain idle so as to permit the accumulation of rust and grit, the extremities of the cutter bar eventually rust tight within their respective sockets making it very difficult to adjust the same. Likewise the set screws which have heretofore been employed to effect the adjustment of the cutter bar about its pivotal axis, become rusted in position and hence are difficult to turn. Conventional types of cutter bars cannot be readily removed for purposes of repair or replacement without dismantling a considerable portion of the lawn mower.

It is an object of my invention to overcome the above mentioned and numerous other inconveniences and difficulties by so mounting the cutter bar, as by means of a ball-bearing support, that said cutter bar may be easily adjusted at all times and to further expedite the adjustment of said bar I propose to equip the same with a relatively long adjusting arm, the outer or free end of which may be moved with little effort on the part of the user.

More specifically, it is an object of my present invention to provide a cutter bar arrangement in which the ball-bearing mounting therefor is so designed as to not only permit of free pivoting for adjusting the cutter bar but also to secure said bar against lateral displacement. In other words, my invention contemplates the mounting of the cutter bar in such a manner as to prevent the same from freezing or rusting tight to the lawn mower side frames as has heretofore been experienced and also to secure the bar against any possibility of longitudinal shifting with respect to the reel blades.

A still further object of my present invention is to provide, in combination with a cutter bar as above set forth, a means which will not only permit said bar to be easily adjusted but which will serve to enable the accurate adjustment of the cutter bar within very close limits. In other words, my invention renders possible a sensitivity of adjustment which greatly increases the efficiency of operation of the lawn mower.

In addition to the above mentioned advantageous characteristics, my invention contemplates the provision of an improved reel shaft mounting and to that end I propose to provide a means in association with each extremity of said shaft which will compensate for wear occasioned at the shaft extremities and thereby maintain the correct position of the reel blades with respect to the cutter bar at all times.

With the foregoing and other objects in view which will appear in the following description, the invention resides in the novel combination and arrangement of parts and in the details of construction herein described and claimed.

In the drawings:

Figure 1 is a plan view of a lawn mower constructed and arranged in accordance with the teachings of my invention;

Figure 2 is a side elevational view of the lawn mower shown in Figure 1;

Figure 3 is a side elevational view similar to Figure 2 with the wheel removed and shown in dotted lines for the purpose of more clearly illustrating parts otherwise hidden;

Figure 4 is a sectional view through the reel and wheel shafts taken substantially along the line 4—4 of Figure 3;

Figure 5 is a fragmentary sectional view taken along the line 5—5 of Figure 3;

Figure 6 is an enlarged fragmentary plan view of the cutter bar and support, disclosing the end portion of said bar with the tightening bolt removed;

Figure 7 is a side elevational view of the structure shown in Figure 6;

Figure 8 is a vertical sectional view taken substantially along the line 8—8 of Figure 6 with the retention bolt shown in association therewith;

Figure 9 is a fragmentary vertical sectional view of one end of the cutter bar and mounting therefor taken substantially along the line 9—9 of Figure 4;

Figure 10 is a plan view of the cutter reel showing the side frames and wheels in section;

Figure 11 is an enlarged fragmentary sectional view of one end of the reel shaft and side frame adjacent thereto, disclosing the functional characteristics of my improved reel shaft mounting;

Figure 12 is a view similar to Figure 11 with the cone shown in section to more clearly disclose the position of the clutching device mounted in the reel shaft;

Figure 13 is a detailed view of the driving end of the reel shaft; and

Figure 14 is a transverse sectional view thereof taken substantially along the line 14—14 of Figure 13.

Referring now to the drawings wherein like numerals have been employed to designate similar parts throughout the various figures, it will be observed that my invention has been disclosed in connection with a lawn mower which I have designated generally by the numeral 10, Figures 1 to 3 inclusive. This lawn mower includes a pair of side frames 12 and these side frames are secured in the usual manner to the yoke portion at the lower extremity of the lawn mower operating handle 14. Thus the handle 14 and the frames 12 are secured together as a unit. Mounted at each extremity of a shaft 16 which passes through the center of the frames 12 are a pair of wheels 18 which serve to partially enclose said frames. The central portion of each of the wheels 18 is provided with an inwardly extending hub 20, Figure 10, which is mounted upon the shaft 16 and the inner peripheral surface of each of said wheels is provided with gear teeth 22 which mesh with pinions 24 mounted upon a cutter reel shaft 26.

Thus, as the lawn mower is pushed through the agency of the handle 14, rotation imparted to the wheels 18 will cause rotation of the reel shaft 26. This reel shaft 26 supports a plurality of blades 28 and these blades co-operate with a cutter bar 30 positioned at the lower rearward portion of the side frames 12, Figures 2 to 9 inclusive.

This cutter bar 30 traverses the underside or portion of the lawn mower, the forward extremity thereof having a cutting edge 32 which co-operates with the cutting edges of the blades 28 to effect the cutting of grass. The rear margin of the cutter bar 30 is secured in any suitable manner, such as by means of rivets 34 to a transverse mounting or frame 36. Each extremity of this frame 36 is provided with an outwardly extending support arm 38, Figures 3, 6 and 7. An aperture 40 provided within the support arm 38 is adapted to receive a retaining bolt 42 which serves as a means for clamping the frame 36 to the side frame 12. It will be observed that each of the side frames 12 is provided with a laterally extending portion or arm 44 which corresponds in shape and co-operates with the support arm 38 of the frame 36. Each of the arms 38 and 44 are provided with companion sockets 46, Figure 9, which co-operate to receive a ball-bearing 48. It will thus be apparent that in order to clamp the cutter bar and mounting therefor to the side frame 12, it is only necessary to properly insert the tightening bolt 42 through the aperture 40 and to properly position the bearings 46 in their respective sockets and then tighten nuts 50. In this connection it is to be observed that bolt heads 52 fastened to the shank of the bolts 42 are loosely received by a recess 54, Figures 8 and 9, formed in the frame 36, and when the nut 50 is tightened, the upper surface of the bolt heads 52 are clamped against a knife edge 56. It will be seen that this knife edge is positioned horizontally along a line which passes through the center of the ball-bearings 46. Thus, when the parts are clamped together, the frame 36 carrying the cutter bar 30, may be rotated about an axis which is determined by the edge 56 and the center of the ball-bearings 46. Sufficient play is allowed between the bolt head 57 and the walls of the recess 54 to permit of sufficient movement of the cutter bar.

From the description thus far given it will be apparent that by reason of the ball-bearing mounting, the cutter bar 30 may be rotated or sufficiently shifted for purposes of adjusting the position of the cutting edge 32 thereof with respect to the cutting edges of the blades 28. In order to expedite the proper adjusting of the cutter bar 30, I provide a pair of levers 58 which are inclined upwardly from each end of the cutter bar unit and are secured at their lower extremities in any suitable manner to the frame 36 of said unit as by means of rivets 60. The upper or free extremity of each of the lever arms 58 carries a pin 62, Figures 1 and 4, which is threaded at one extremity to receive a wing nut 64. The pin 62 extends through a slot 66, Figures 2 and 3, provided in the side frame 12 and from the foregoing it will be apparent that these lever arms 58 may be moved within the limits determined by the length of the slots 66 so as to adjust the position of the cutter bar 30. By employing these relatively long lever arms 58, I am able to attain a very sensitive adjustment of the cutter bar. In other words, by having the tightening or wing nut 64 positioned at a considerable distance from the pivotal axis of the cutter bar in the manner disclosed, any appreciable movement imparted to the free ends of the lever arms will impart a very small movement to the cutting edge of the cutter bar. In adjusting a cutter bar it is only necessary to impart a very slight movement to the cutting edge thereof to obtain the desired adjustment. In devices heretofore employed it has not been possible to obtain this desired sensitivity in adjustment. In order to properly adjust the cutter bar each end thereof should be provided with suitable adjusting means and I accomplish this by mounting the lever arms 58 at each extremity of the bar. It is also to be noted that by having these lever arms conveniently positioned adjacent to the side frames in the manner disclosed the same will not in any way prevent the cut grass from being thrown rearwardly through the action of the reel blades. It will also be clear that the cutter bar may be removed for purposes of repair or replacement with very little difficulty, it being only necessary to loosen the nuts 50 and the wing nuts 64.

Referring now to Figure 4 and Figures 10 to 14 inclusive, it will be observed that I provide a very practical and novel arrangement for properly mounting the driving ends of the reel shaft 26. As already set forth, rotation is imparted to the pinions 24 through the agency of the internal gear teeth on the lawn mower wheels, and a hub 68 provided on each of the pinions is provided with a recess 70 which receives a driving pin 72 carried by the shaft 26. Thus rotation is imparted to the shaft 26 by means of the pins 72 and the pinions 24. Each of the side frames 12 is formed with a bearing or boss 74 which is designed to receive a hardened bearing cup or ball-bearing retainer 76, Figures 11 and 12. A conical member 78 which is slidably mounted upon the shaft 26 cooperates with the cup or retainer 76 and ball-bearings 80 to provide a mounting for the shaft 26. Interposed between the end of the conical member 78 and the inner surface of a cylindrical retainer 82 is a coil spring 84. This coil spring continuously urges the conical member into engagement with the ball-bearings retained within the cup-shaped member 76. The retainer 82 bears against the spider frame 86 which supports the reel blades 28, said frame being secured to the shaft 26. There is usually a certain amount of wear in the ball races of the reel and this spring 84 serves to normally urge the cone against the ball-bearings 80 so as to automatically take up such wear. In order to prevent the conical member 78 from moving to the right, Figures 11 and 12, I provide a loose ball 88 within a tapered recess 90. Any tendency for the conical member to shift to the right will be prevented by the binding action of the ball 88 as said ball is urged along the inclined surface of the recess. It will be apparent that if the conical member were permitted to slip back, the reel bearing would be loosened which would, of course, disturb the relationship between the reel blades and the cutter bar. By employing the loose ball 88, this possibility is positively avoided, thus retaining a true and accurate bearing for the reel at all times.

From the foregoing it will be apparent that my invention provides a very effective and conveniently operable means for accurately adjusting a cutter bar with respect to the reel blades. The ball-bearing mounting for the cutter bar is such that the cutter bar may be freely pivoted. In other words, there is no possibility of the cutter bar freezing or rusting tight to the side frames as has heretofore been experienced in certain instances when conventional types of cutter bar mountings have been employed. In addition to providing a freely pivoted cutter bar, my invention enables said bar to be sensitively adjusted within required limits with very little effort or skill on the part of the user. Furthermore, by employing my improved construction, the cutter bar may be easily removed for purposes of repair or replacement without disturbing or dismantling any of the lawn mower parts such as the side frames and elements supported thereby. In addition to providing a pivotal construction which will not rust or freeze tight, the ball-bearing arrangement provides an effective means for securing the cutter bar against lateral movement, that is to say, against movement in a direction parallel to the reel axis. The mechanism provided on the reel shaft for taking up wear also insures the proper positioning of the reel blades with respect to the cutting edge of the cutter bar at all times. Thus my invention provides a lawn mower arrangement of very practical construction. All the parts comprising the same may be easily manufactured by the usual shop practice and very conveniently assembled. The lubricating system which is disclosed in the drawings has not been described in connection with the present invention because it forms the subject matter of a separate application which is being filed of even date.

Although I have herein described a specific embodiment of my invention, it is to be understood that other changes and modifications may be made without departing from the spirit and scope of my invention as set forth in the appended claims.

Having thus described my invention, what I claim as new and desire to secure by Letters Patent is:

1. In a lawn mower of the class described having a pair of side frames, a movable blade mounted between said frames, and a cutter bar unit adapted to be clamped in pivotal relation against the outer surface portions of said side frames, and elongated means for adjustably positioning the cutter bar with respect to the blade.

2. In a lawn mower of the class described having a pair of side frames, a movable blade, a frame member extending laterally of said side frames, a cutter bar pivotally mounted upon the under side of said lateral frame member, a pair of lever arms secured at one extremity to the end portions of the cutter bar, the other extremities of said lever arms being adjacent and at the forward portion of said side frames, and means for securing said lever arms in various angular positions to said side frames.

3. In a lawn mower of the class described, a movable blade, a cutter bar unit operatively associated therewith, a frame for mounting said cutter bar unit, a ball-bearing connection between said cutter bar unit and said frame whereby said unit may be freely pivoted for the purpose of adjusting the same with respect to the blade, and means for clamping said unit and frame together, said means engaging one of said members at a point which is in horizontal alignment with the center of the ball-bearing connection so as to effect free relative movement between the cutter bar unit and frame.

4. In a lawn mower of the class described, a rotary blade, an axial support for said blade, a pair of frames for receiving said blade support, a ball race associated with each of said frames, a conical member slidable upon said blade support for co-operating with said ball race to maintain the blade in proper operating position, resilient means for constantly urging said conical member toward the ball race, and a rotary clutching member interposed between the conical member and the blade support for preventing movement of the conical member away from the ball race.

5. In a lawn mower of the class described, a rotary blade, an axial support for said blade, a pair of frames for receiving said blade support, a ball race associated with each of said frames, a conical member slidable upon said blade support for co-operating with said ball race to maintain the blade in proper operating position, resilient means for constantly urging said conical member toward the ball race, and a ball interposed between the conical member and the blade support, said ball being mounted within a recess formed in one of said parts and adapted to prevent movement of the conical member away from the ball race.

6. In a lawn mower of the class described, a movable blade, a pair of side frames, rotatable reel blades, a support for said reel blades including a shaft adapted to extend into said side frames, a ball race provided in each of said side frames, a conical member slidably mounted upon said reel shaft adjacent each of said ball races, a coil spring encircling said shaft and adapted to constantly urge said conical member into operative association with said ball race, a recess formed within said shaft adjacent each of said conical members so as to present an inclined surface, and a clutching ball within said recess which is adapted, in response to any tendency of the conical member, to move away from the ball race, to move along said inclined surface and thereby positively prevent the movement of the conical member away from said ball race.

7. In a lawn mower of the class described having a pair of side frames, a movable blade mounted between said frames, a cutter bar unit extending between said frames, a bearing member interposed between said cutter bar unit and said frames to permit said cutter bar unit to be tilted with respect to said blades, a clamping screw extending between the frames and cutter bar unit, said screw being positioned so as to clamp the bearing between said parts without affecting the tiltability of said cutter bar unit, and means for adjustably tilting said cutter bar unit to position the same with respect to said blades.

In witness whereof, I have hereunto subscribed my name.

ALVIN V. ROWE.